United States Patent [19]

Lang

[11] Patent Number: 5,229,160
[45] Date of Patent: Jul. 20, 1993

[54] TOMATO PROCESSING METHOD

[75] Inventor: Timothy R. Lang, Chatswood, Australia

[73] Assignee: Processing Technologies International Ltd., Hamilton, Bermuda

[21] Appl. No.: 672,826

[22] Filed: Mar. 21, 1991

[51] Int. Cl.⁵ .............................. A23L 1/212
[52] U.S. Cl. .................... 426/615; 426/481; 426/482
[58] Field of Search ............... 426/481, 482, 483, 484, 426/615, 599

[56] References Cited

U.S. PATENT DOCUMENTS

| | | | |
|---|---|---|---|
| 3,220,857 | 11/1965 | Hollis | 428/482 |
| 3,250,630 | 5/1966 | Webster | 426/615 |
| 3,396,769 | 8/1968 | Hirahara | 426/482 |
| 3,467,156 | 9/1969 | Hirahara | 426/482 |
| 3,873,753 | 3/1975 | Nelson | 426/615 |
| 4,297,381 | 10/1981 | Tenuta | 426/482 |
| 4,315,039 | 2/1982 | Levati | 426/482 |
| 4,363,264 | 12/1982 | Lang | 306/87 |
| 4,472,444 | 9/1984 | Studer | 426/484 |
| 4,950,493 | 8/1990 | Kobes | 426/484 |
| 4,981,220 | 1/1991 | Kolodesh | 426/484 |
| 5,037,662 | 8/1991 | Poulose | 426/615 |
| 5,096,719 | 3/1992 | Gresch | 426/615 |

*Primary Examiner*—Carolyn Paden
*Attorney, Agent, or Firm*—Christie, Parker & Hale

[57] ABSTRACT

Tomatoes and other fruit may be processed so as to avoid destroying viscosity inducing components by passing the sliced fruit through a counter current extractor in counter current with an aqueous liquid, the liquid being at a temperature of at least 65° C.; recovering a liquid phase from the lower end of the counter current extractor and a solid phase from the upper end of the extractor; recovering flavour and/or aroma components from the liquid phase; subjecting the solid phase to a finishing process to remove skins and/or seeds therefrom; and dewatering the finished solid phase to increase the viscosity thereof.

8 Claims, 1 Drawing Sheet

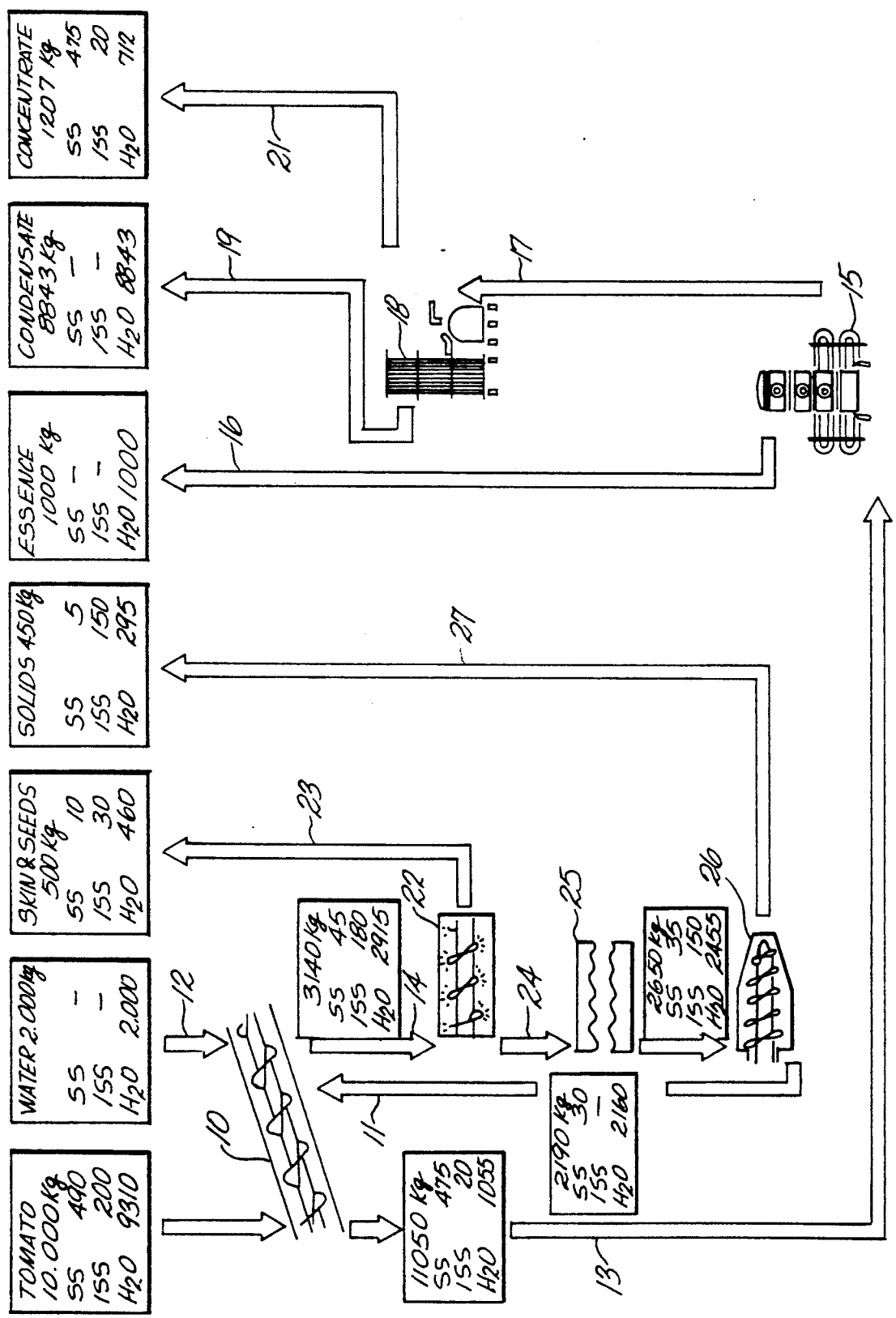

TOMATO PROCESSING METHOD

THE FIELD OF THE INVENTION

The present invention relates to a novel method for the processing of tomatoes and other fruits and to products prepared by that method.

BACKGROUND ART

The conventional processing of tomatoes to standard formulated products (sauce, juice and paste) consists of the following basic steps.

| Seasonal | Milling |
|---|---|
| | Heating ("breaking" the tomato) |
| | Finishing to |
| | remove skins and seeds |
| | reduce particle size |
| | Evaporation |
| | Aseptic filling |
| | Storage |
| On demand | Formulation |
| | Packaging |

It in known that:

Yield of formulated tomato products (sauce, juice and paste) per tonne or raw tomato is a function of viscosity.

Viscosity is a property imparted by the insoluble fraction of tomatoes.

The insoluble fraction of tomatoes is cell wall tissue and is often loosely described as
Cellulose
Hemicellulose, and
Pectins or proto-pectins These are groups of as yet poorly defined compounds of large molecular size.

During conventional processing it is well known that there is considerable loss of viscosity.

This loss is reduced by "heating" the tomato before removal of skins and seeds (a process known in the industry as "breaking").

Heating denatures the enzyme responsible for loss of viscosity (polygalacturonase). The enzyme is heat resistant and high temperatures are required.

Polygalacturonase is present throughout the cell walls even in immature tomato fruits.

It is not yet properly understood how the activity of polygalacturonase is triggered in whole mature fruit to denature the cell walls and soften the fruit.

One possible reason that polygalacturonase does not immediately break down pectins in the cell wall during maturation is the presence of calcium bridges in the molecular structure of the pectins. The Ca bridges inhibit the action of the enzyme. The polygalacturonase is an endopectolytic enzyme which splits the large pectin molecules internally breaking them down into smaller poly or oligo galacturonic acid units but not to single galacuturonic acid molecules.

During conventional processing the fruit is milled macerating the cell walls and disrupting cell structure. Organic acids (notably malic and citric acids) which are isolated from the cell wall in the organised cells of whole fruit are now brought into contact with cell wall material.

There is some evidence to suggest that citric acid (a strong chelating agent) chelates the calcium away from the pectin molecules removing the barrier to polygalacturonase activity. In these circumstances loss of viscosity is extremely fast, significant losses occurring in microseconds.

It is known that temperatures of 70°-75° C. will denature polygalacturonase in tomatoes. However, due to limitations in heat transfer, milled tomatoes heated to this temperature will lose significant viscosity because of the high activity of the enzyme during heat up. Such products are of high quality in flavour and colour and are termed "cold break". On the other hand if milled tomatoes are heated to 95°-100° C. (hot break) denaturing of enzymes is quicker and higher viscosity results along with some loss in quality of flavour and colour.

DISCLOSURE OF THE INVENTION

In the present invention fruit or vegetable cells are heated to a temperature which inhibits polygalacturonase, whilst, still intact. Thus eliminating the situation where chelation of calcium can occur when active enzyme is present and resulting, in preferred embodiments of the invention, in high viscosity and yield. Heat transfer is extremely efficient and it is not necessary to maintain a high temperature differential between the heating medium and the tissue.

The present invention consists in a method of processing fruit or vegetables comprising the steps of:
i) slicing the fruit,
ii) passing the sliced fruit in counter current with an aqueous liquid in a counter current extractor, the liquid being at a temperature such that the fruit slices are heated to a temperature of at least 65° C.,
iii) recovering a liquid phase from the lower end of the counter current extractor and a solid phase from the upper end of the counter current extractor,
iv) subjecting the solid phase to a finishing process to remove skins and/or seeds therefrom, and
v) dewatering the finished solid phase to increase the viscosity thereof.

The fruit more preferably comprise tomatoes which are fully ripe with a Brix value of from 5° to 7°. They are sliced in a conventional slicer after washing in the usual manner. Fruit other than tomatoes may be processed by the method according to this invention where high viscosity products are desired. To this extent the term tomatoes as used hereinafter is taken to include all fruit susceptible to the present method. The present process is also particularly applicable to apples and pears where the solid phase is useful as a low flavour high viscosity filler.

The tomato slices may be subjected to counter current in any known type of counter current extractor. It is however highly preferred that the extraction is carried out in a counter current extractor as described in U.S. Pat. No. 4,363,264 the contents whereof are incorporated herein by reference. The sliced tomatoes are fed into the lower end of a channel shaped trough and are moved up the trough in a counter current with water or another aqueous liquid which has been heated sufficiently to raise the temperature of the tomatoes to a desired temperature. If the product to be produced is to be of the cold break type then a temperature of at least 65° C., more preferably between 70° and 80° C., more preferably 75° C. should be attained. If the product to be produced is to be of the hot break type then a temperature of at least 86° should be attained. It should be mentioned in this respect that the polygalacturonase in different fruits is denatured at different temperatures.

Thus the temperature to which the fruit must be heated for optimum results will vary from fruit variety to fruit variety. In order to raise the temperature of the tomato slices to the desired degree the incoming aqueous liquid must be at least slightly higher than the desired temperature. In preferred embodiments of the invention the heating to the desired temperature takes place very rapidly, preferably substantially instantaneously upon the tomato slices entering the counter current extractor. The liquid may, as has been indicated above, be water, however, it may be a salt or sugar solution or, most preferably serum derived from the treatment of tomatoes or other fruit or vegetables. In the latter case it is desirable that the serum has been obtained by a "hot-break" method such that it is free of viscosity reducing enzymes.

The liquid and solid phases are recovered from the counter current extractor in the usual way. It will be appreciated that the liquid phase will contain fine suspended solids and that the solid phase will have an appreciable water content.

The liquid phase or serum contains a large proportion of the aroma and flavour components of the tomatoes. This liquid phase is preferably fractionated in a spinning cone column, a still or other volatile component recovery apparatus to separate the volatile aroma components. The remaining solution of flavour compounds, generally salts and sugars, may be concentrated in the normal manner such as through reverse osmosis and/or an evaporator.

The solids phase is then subjected to a conventional finishing operation in, for instance, a brushed screen finisher. The finisher removes the skin and seeds from the tomato solids and produces a pulp of very high viscosity. This pulp contains a high proportion of the viscosity inducing ingredients of the tomato and most of its colour. Due to the rapid heating of the tomato slices the viscosity inducing ingredients and colour have been largely preserved and are present in the pulp derived from the finisher.

The pulp derived from the finisher needs to be dewatered to form a concentrate suitable for storage, transport and reformulation. This dewatering step is aided by the surprising discovery that a rapid freeze and thaw of the pulp allows it to be readily dewatered in a decanter, a centrifuge or other apparatus known for dewatering pulps. The dewatering step may however be carried out in a second finisher which retains the bulk of the solids while allowing serum to separate out.

The process according to at least the preferred embodiments of the present invention has a number of advantages over the known prior art processes. The process produces three tomato fraction, viz:
  i) Aroma,
  ii) Flavour, and
  iii) Colour and viscosity These fractions may be recombined in any combination allowing total flexibility when formulating pastes, juices or sauces.

The tomato products resulting from the product exhibit significantly improved viscosity levels when compared with products of the same level of soluble and insoluble components from traditional processes. The quality and stability of the colour of tomato products from the present process is significantly better than that achieved by traditional procedures.

BRIEF DESCRIPTION OF THE DRAWINGS

Hereinafter given by way of example only is a preferred embodiment of the present invention described with reference to the accompanying drawing which shows diagramatically the steps in the process and the mass transfer associated with each of these steps. In the drawing the following abbreviations are used:
  SS = soluble solids
  ISS = insoluble solids
  $H_2O$ = water

BEST MODE FOR CARRYING OUT THE INVENTION

The ripe tomatoes at 6° Brix are sliced in a conventional slicer (not shown) to a thickness of from 2 to 4 mm. It is to be noted that at this stage less than 1% of cell walls have been ruptured, the remainder remain intact and the cells organised.

The slices fall directly into the lower end of a counter current extractor 10, generally as described in U.S. Pat. No. 4,363,264 and are moved therethrough in counter current with a recycle stream 11 of tomato serum heated to approximately 95° C. The serum recycle stream 11 is introduced part way up the counter current extractor 10 and contact with the recycle stream heat causes the tomato slices to be substantially instantaneously heated to a break temperature of about 75° C.

As the slices are conveyed up the counter current extractor 10 against the serum recycle stream and against a counter current flow 12 of water heated to 86° C. which is introduced into the counter current extractor at its upper end. The soluble solids in the tomatoes responsible for flavour and aroma diffuse into the liquid stream from the cells as a liquid phase stream 13 while the insoluble solids responsible for colour and viscosity are discharged at the upper end as a solid phase stream 14.

The liquid phase stream 13 is directed to a spinning cone column 15 made as described in Australian patent specification 53350/86 (the contents whereof are hereby incorporated by reference). The volatile essence is recovered as a final product stream 16 with or without concentration. The underflow 17 from the spinning cone column is passed through a multistage film plate evaporator 18 to concentrate the liquid. This concentration step may if desired, by partially achieved by reverse osmosis. The evaporator produces a water condensate stream 19 and a flavour concentrate stream 22.

The solid phase stream 14 from the counter current extractor 10 is fed to a brushed screen finisher 22 which produces a skin and seed stream 23 and a pulp stream 24.

The pulp stream 24 is fed to a Spiraflow type heat exchanger 25 to cause rapid freezing and thawing of the stream. This breaks the stability of the pulp and assists decanting of the pulp stream 24 in a decanter 26. The decanted pulp provides the tomato serum stream 11 for recycling through the counter current extractor as well as the insoluble solids stream 27 which contain the viscosity and colour components of the tomatoes. This dewatered solids stream 27 may have its water binding capacity and viscosity restored by running it back through the finisher 22.

The process thus results in three distinct products, viz:
  i) The concentrated serum stream 21 containing tomato flavour, ii) The essence 16 containing volatile aroma compounds, and iii) Dewatered pulp 21 containing colour and viscosity.

These components may be reconstituted to give a tomato base of exceptionally high quality in colour, flavour and aroma and also a substantially increased viscosity as compared to that of conventionally processed tomato products. It is also possible to reformulate these components in proportions difference from that occurring in the whole fruit, thus providing a range of new products of interest to food processors.

From the foregoing description, it should be apparent that the invention encompasses an advantageous advance in the art. Furthermore, it should be clear that the invention may be embodied in other specific forms without departing from the spirit of the essential characteristics thereof. The present embodiments are, therefore, to be considered in all respects as illustrative and not restrictive.

I claim:

1. A method of processing tomatoes comprising the steps of:

slicing the tomatoes, passing the sliced tomatoes in counter current with a serum derived from the tomatoes in a counter current extractor, the serum being at a temperature such that the tomato slices are heated to a temperature of at least 70° C. while the tomato slices are still intact, recovering a liquid phase from the lower end of the counter current extractor and a solid phase from the upper end of the counter current extractor, subjecting the solid phase to a finishing process to remove skins and/or seeds therefrom, and dewatering the finished solid phase to increase the viscosity thereof.

2. A method as claimed in claim 1 in which the tomatoes are fully ripe with a Brix value of from 5° to 7°.

3. A method as claimed in claim 1 in which the tomato slices are heated to a temperature of at least 86° C.

4. A method as claimed in claim 1 in which the liquid recovery phase from the lower end of the counter current extractor is treated to recover therefrom flavour and/or aroma components of the tomato.

5. A method as claimed in claim 1 in which the finishing is carried out in a brushed screen finisher.

6. A method as claimed in claim 1 in which the finished solid phase is dewatered by passing it through a further finisher.

7. A method as claimed in claim 1 in which the finished solid phase is obtained through a process of freezing and thawing prior to being dewatered.

8. A method as claimed in claim 7 in which the finished solid phase is dewatered in a decanter or a centrifuge.

* * * * *

UNITED STATES PATENT AND TRADEMARK OFFICE
CERTIFICATE OF CORRECTION

PATENT NO. : 5,229,160
DATED : July 20, 1993
INVENTOR(S) : Timothy R. Lang

It is certified that error appears in the above-indentified patent and that said Letters Patent is hereby corrected as shown below:

```
Column 1, line 25, change "It in known" to
             -- It is known --.
Column 1, line 27, change "tonne or" to -- tonne of --.

Column 2, line 55, change "whereof" to -- thereof --.

Column 3, line 54, change "fraction" to -- fractions --.

Column 4, line 42, change "whereof" to -- thereof --.
Column 4, line 48, change "by partially" to
             -- be partially --.
Column 4, line 50, change "stream 22" to -- stream 21 --.

Column 5, line 10, change "difference" to -- different --.
Column 5, line 18, change "spirit of" to -- spirit or --.
```

Signed and Sealed this

Fifteenth Day of March, 1994

Attest:

BRUCE LEHMAN

Attesting Officer    Commissioner of Patents and Trademarks